United States Patent [19]

Inglis

[11] Patent Number: 4,688,472
[45] Date of Patent: Aug. 25, 1987

[54] NOISE REDUCTION SPOILER FOR A DAMPER

[75] Inventor: Stephen C. Inglis, Kirkville, N.Y.

[73] Assignee: Carrier Corporation, Syracuse, N.Y.

[21] Appl. No.: 925,939

[22] Filed: Oct. 31, 1986

[51] Int. Cl.⁴ .............................................. F01N 1/16
[52] U.S. Cl. ........................................ 98/1; 181/277; 251/305
[58] Field of Search .............. 98/1; 137/560; 251/305; 181/270, 277

[56] References Cited

U.S. PATENT DOCUMENTS

| | | | |
|---|---|---|---|
| 2,095,263 | 10/1937 | Moss | 251/305 |
| 3,238,955 | 3/1966 | Lassiter | 181/226 |
| 3,442,489 | 5/1969 | Cary et al. | 251/305 |
| 4,185,657 | 1/1980 | McCabe | 251/305 |

Primary Examiner—Albert J. Makay
Assistant Examiner—David W. Westphal
Attorney, Agent, or Firm—David J. Zobkiw

[57] ABSTRACT

A spoiler is located on the damper blade of a damper assembly such that it serves to divert the flow from the hinge area to avoid air separation. Further, the spoiler does not define the most restricted portion of the flow path and thereby has a minimal effect on the flow resistance.

3 Claims, 4 Drawing Figures

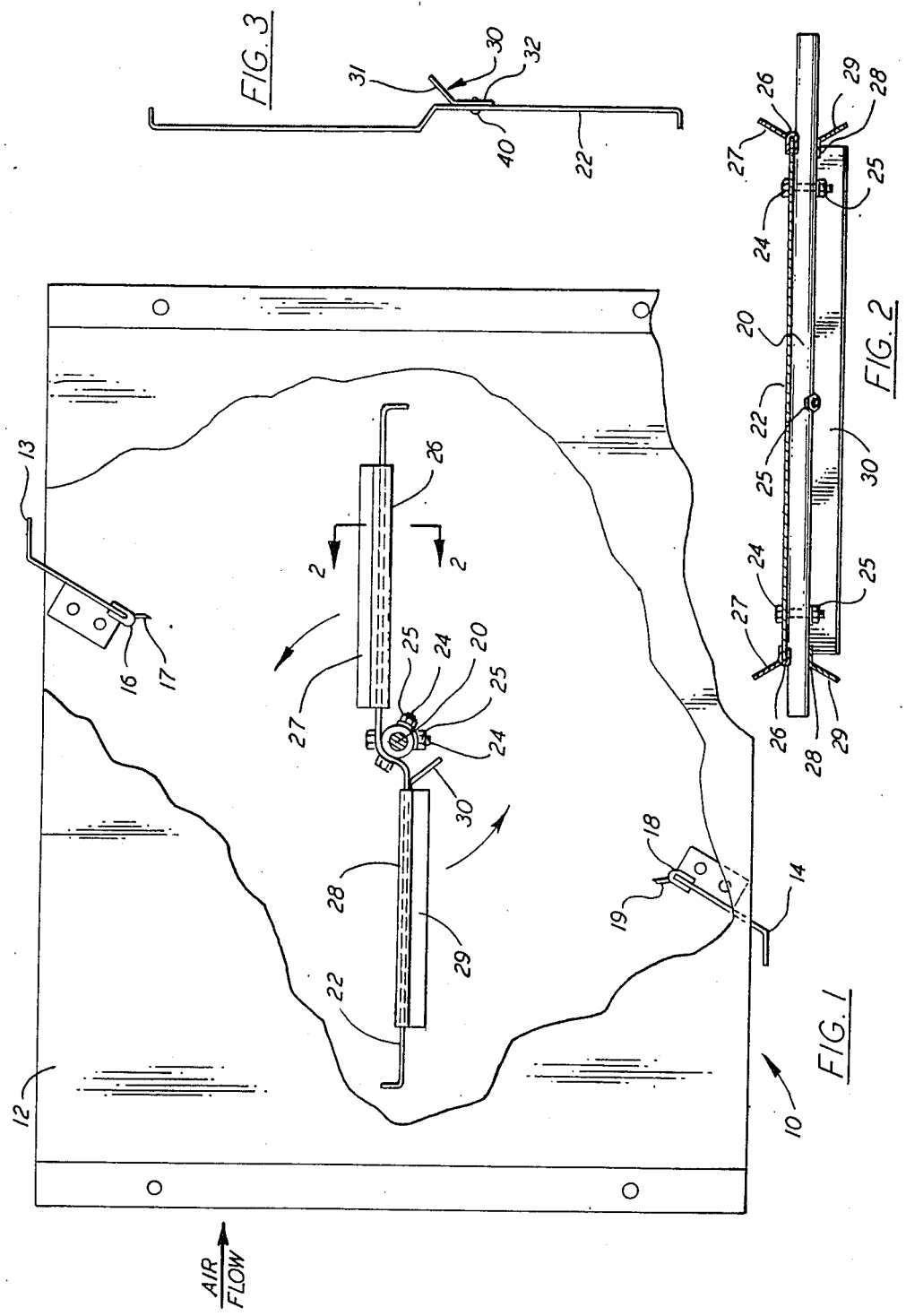

| FLOW (CFM) | PRESSURE DROP (IN.H₂O) | CHANGE IN RADIATED NOISE (dB) CYCLES | | | | | | | |
|---|---|---|---|---|---|---|---|---|---|
| | | 63 | 125 | 250 | 500 | 1000 | 2000 | 4000 | 8000 |
| 4000 | .07 | 1.1 | 1.2 | -1.4 | 0.2 | 1.0 | 1.3 | 2.5 | 1.8 |
| | .50 | 0.3 | -0.1 | -1.2 | -5.4 | -0.1 | 0.0 | 0.5 | -0.6 |
| | 1.0 | -0.2 | 0.3 | 0.1 | -3.4 | -0.3 | 0.5 | 0.6 | -2.2 |
| | 1.5 | -1.6 | 0.2 | 0.2 | -2.0 | -0.3 | 0.2 | 0.1 | -0.5 |
| | 2.0 | -1.1 | 0.3 | 0.3 | -1.6 | -0.4 | 0.1 | -0.2 | -0.8 |
| | 3.0 | -1.7 | 0.0 | 0.5 | 0.1 | -2.1 | -0.2 | -0.2 | -0.5 |
| 3500 | .05 | 1.4 | 1.2 | -0.5 | 0.4 | 1.0 | 1.8 | 2.9 | 1.5 |
| | .50 | 1.3 | 0.6 | -2.1 | -4.3 | 0.6 | 0.5 | 1.2 | 0.2 |
| | 1.0 | 0.2 | 0.0 | -0.2 | -4.0 | 0.0 | 0.0 | 0.1 | -0.7 |
| | 2.0 | -1.3 | 0.4 | 0.6 | -0.8 | -0.1 | -0.6 | -0.5 | -0.6 |
| | 3.0 | -1.5 | 0.1 | 0.8 | 0.4 | -0.8 | -0.8 | -0.8 | -0.6 |
| 3000 | .03 | 1.8 | 1.0 | -0.3 | 0.6 | 1.0 | 2.1 | 3.0 | 0.6 |
| | .50 | -0.1 | 0.1 | -3.4 | -2.8 | -0.1 | -0.3 | 0.5 | -3.8 |
| | 1.0 | -0.6 | 0.3 | -0.2 | -5.1 | -0.5 | -0.8 | -0.3 | -1.0 |
| | 2.0 | -1.7 | 0.2 | 0.6 | -0.5 | -0.3 | -1.3 | -1.1 | -1.0 |
| | 3.0 | -1.9 | 0.7 | 0.8 | 0.9 | 0.2 | -1.0 | -0.9 | -0.5 |
| 2500 | .02 | 1.0 | 0.0 | -0.1 | 0.3 | 0.9 | 2.4 | 3.1 | -0.1 |
| | .50 | 0.3 | 0.2 | -3.4 | -1.4 | 0.4 | -0.7 | 0.0 | -5.3 |
| | 1.0 | 0.6 | 0.7 | 0.0 | -4.3 | -0.7 | -1.5 | -1.1 | -4.8 |
| | 2.0 | -1.9 | 0.8 | 0.8 | -0.1 | 0.1 | -1.3 | -0.9 | -0.4 |
| | 3.0 | -1.7 | 0.7 | 1.1 | 0.9 | 0.3 | -1.3 | -0.9 | -0.3 |
| 2000 | .01 | 0.2 | 0.3 | 0.3 | 0.6 | 1.3 | 3.1 | 0.4 | -0.1 |
| | .50 | 0.2 | 0.8 | -3.5 | -0.7 | 0.7 | -1.2 | 0.5 | -7.2 |
| | 1.0 | 0.2 | 1.4 | 0.6 | -2.5 | -0.4 | -1.5 | -0.6 | -0.3 |
| | 1.5 | -0.2 | 0.9 | 0.8 | -0.5 | -0.2 | -1.6 | -0.9 | -0.6 |
| | 2.0 | -2.0 | 0.7 | 1.0 | -0.2 | -0.1 | -1.5 | -0.9 | -0.3 |
| | 3.0 | -2.9 | 0.5 | 1.1 | 0.4 | -0.1 | -2.0 | -1.3 | -0.3 |

FIG. 4

NOISE REDUCTION SPOILER FOR A DAMPER

BACKGROUND OF THE INVENTION

The present invention relates to damper structures and more specifically to the reduction of low frequency noise in damper structures.

Air flow structures such as dampers are subject to self-generated noise which is a function of the velocity and pressure of the delivered air as well as the structural details of the air distribution system. Because the duct opens into the room or zone through one or more terminals, the noise may be delivered along with the conditioned air. There is an apparently random distribution of the noise but the noise generation is greatest at lower static pressures where a hollow whistle akin to that resulting from blowing over a bottle is produced. The noise generation is apparently the result of air separation at the hinge area due to the transition in the damper blade.

SUMMARY OF THE INVENTION

The present invention reduces low frequency noise in the damper by attaching a spoiler to the damper in the hinge area on the downstream side of the damper. The noise is generally reduced but there is a relatively small increase in noise at some frequencies. Thus, there are tradeoffs resulting in reduction of noise at the loudest and/or most irritating frequencies but the net result is a general noise reduction.

It is an object of this invention to reduce the overall noise levels in a damper unit.

It is another object of this invention to reduce the noise created by air separation at the blade attachment point.

It is an additional object to provide a more uniform air distribution when the damper is nearly closed.

It is a further object of this invention to reduce the overall noise levels in a damper unit without sacrificing the pressure drop in the wide open position. These objects, and others as will become apparent hereinafter, are accomplished by the present invention.

Basically, in a damper unit where the damper blades make a stylized S in cross section and the hinge is located at the transition area, a spoiler is located on the downstream side of the damper at a point upstream of the hinge to thereby direct the flow away from the hinge area. In the open position this reduces the noise and when the damper is nearly closed it spreads the air rather than letting it hug the damper blade.

BRIEF DESCRIPTION OF THE DRAWINGS

For a fuller understanding of the present invention, reference should now be made to the following detailed description thereof taken in conjunction with the accompanying drawings wherein:

FIG. 1 is a partially cutaway side view of a damper assembly in a full open position;

FIG. 2 is a sectional view taken along line 2—2 of FIG. 1:

FIG. 3 is a side view of the damper blade and spoiler assembly; and

FIG. 4 is a table showing the radiated noise or sound power level for various flow volumes and pressure drops.

DESCRIPTION OF THE PREFERRED EMBODIMENT

In FIG. 1, the numeral 10 generally designates a damper assembly. The damper assembly 10 includes a housing 12 defining a flow path with a pair of angle members 13 and 14. Seals 16 and 18 are suitably secured to angle members 13 and 14, respectively, and include arms 17 and 18 which, respectively, serve as the top and bottom seals or seats. Damper shaft 20 extends through opposite sides of housing 12 and is received in bearings (not illustrated) for rotary movement therein. One end of the damper shaft 20 is connected to an operator (not illustrated) for causing the rotation of damper shaft 20. Damper blade 22 is secured to shaft 20 by a plurality of bolts 24 and nuts 25 and rotates therewith as a unit. As best shown in FIG. 3, the damper blade 22 is shaped like a stylized S from the side. Four side seals including two upper seals 26 and two lower seals 28 are suitably secured to the ends of damper blade 22 and include arms 27 and 29, respectively which coact with the sides of housing 12 in a sealing relationship. Although the shaft 20 is illustrated as located on the downstream side of the stylized S, it could also be located on the upstream side. The device so far described has an unsuitable performance for some operating conditions due to noise generation. This noise geneation is apparaently due to air separation in the hinge area defined by shaft 20. It will be noted that the shaft 20 is located in the transition area of the stylized S at a downstream location and at this location the flow path restricts along the top or upstream face of damper blade 22 and expands along the bottom or downstream face of damper blade 22. At low static pressure, the expanding flow path is most likely to cause air separatin and the resultant noise generation. The projected image of the damper blade in the full open position corresponds to that of the damper shaft so that the area of the flow path through the damper is essentially maximized for the location of seals 16 and 18 which define the opening. In reducing the noise it is essential to avoid sacrificing the pressure drop in the wide open position.

As best illustrated in FIG. 3, a spoiler 30 is secured by rivets 40, or other suitable means, to the downstream side of damper blade 22 at a location which is upstream of the position of damper shaft 20 when the damper blade 22 is in the full open position even when shaft 20 is located on the upstream side of the stylized S. Spoiler 30 includes two arms 31 and 32 making an angle of approximately 135° to form a blunt V. Arm 31 has a length of one half to one inch with three fourths inch preferred. Referring now to FIG. 1 where the damper blade 22 is in the full open position where it is desired to have the least flow resistance, it will be noted that the divided flow paths through the damper assembly 10 are different. In the flow path partially defined by the upstream side of damper blade 22, the cross sectional area of the flow path is reduced at the transition area of the damper blade 22 where the damper shaft 20 is located and is further restricted downstream by seal 16. In contrast, in the flow path partially defined by the downstream side of the damper blade 22, the cross sectional area of the flow path is reduced by the seal 18 but the cross sectional area increases before being again reduced by the spoiler 30. The cross sectional area at the spoiler 30 is, however, larger than that at the seal 18 so that spoiler 30 does not define the most restricted portion of the flow path but does serve to divert the flow away from the damper blade 22 and thereby avoids separation of the air flow and the resultant noise.

The noise generation is not uniform at all frequencies and/or flow rates and the change in noise due to the presence of a spoiler 30 is not uniform. For a 38.20 inch by 13.21 inch damper blade 22 with undesirable noise in the 250–1000 cycle bands, the presence of a spoiler having an arm 31 three fourths inch long changed the noise level as indicated in the table of FIG. 4. The negative numbers indicate the level of noise reduction in decibels while the positive numbers indicate the increase in the noise level. It will be noted that the noise reductions are of greater absolute values than the noise increases and are also greater in number such that there is an overall noise level reduction.

When the damper blade 22 is in the nearly closed position the air flow tends to hug the blade rather than flowing directly towards the outlet and this results in a non-uniform air distribution. The spoiler 30 prevents this hugging flow and causes it to spread out and thereby provides a more uniform flow.

Although a preferred embodiment of the present invention has been illustrated and described, other modifications will occur to those skilled in the art. It is therefore intended that the present invention is to be limited only by the scope of the appended claims.

What is claimed is:

1. A damper assembly comprising
   a housing having an inlet and an outlet and a flow path therebetween;
   a damper shaft extending transversely across said flow path;
   an S shaped damper blade having an upstream and a downstream side and pivotably mounted in said housing about said damper shaft;
   a first seal means for coacting with said upstream side;
   a second seal means for coacting with said downstream side;
   said damper blade being movable between a closed position coacting with said first and second seal means and a fully open position wherein said damper blade presents the minimum projected area relative to said flow path;
   a spoiler means mounted on said downstream side of said damper blade at a point upstream of said damper shaft when said damper blade is in said fully open position;
   said spoiler means including a pair of arms forming a blunt V and located downstream of said first seal means when said damper blade is in the fully open position.

2. The damper assembly of claim 1 wherein said pair of arms make an angle of approximately 135°.

3. The damper assembly of claim 1 wherein one of said pairs of arms is one half to one inch long.

* * * * *